United States Patent
Stone

[19]

[11] Patent Number: 5,892,620
[45] Date of Patent: Apr. 6, 1999

[54] OPTICAL SHUFFLE DEVICE

[76] Inventor: Thomas W. Stone, 1605 Main St., Bethlehem, Pa. 18018

[21] Appl. No.: 725,299

[22] Filed: Oct. 2, 1996

Related U.S. Application Data

[60] Provisional application No. 60/004,716, Oct. 3, 1995.

[51] Int. Cl.$^6$ .................. G02B 5/18; G02B 5/04; H04J 14/00
[52] U.S. Cl. .................. 359/566; 359/117; 359/837
[58] Field of Search .................. 359/558, 559, 359/566, 569, 576, 15, 117, 129, 130, 837; 385/36, 37, 18

[56] References Cited

U.S. PATENT DOCUMENTS

| | | | |
|---|---|---|---|
| 3,547,526 | 12/1970 | Devereux | 359/837 |
| 3,809,455 | 5/1974 | Pekau et al. | 359/15 |
| 4,422,088 | 12/1983 | Gfeller | 385/37 |
| 4,637,691 | 1/1987 | Uehara et al. | 359/837 |
| 4,931,959 | 6/1990 | Brenner | 359/559 |
| 5,115,481 | 5/1992 | Buhrer | 385/36 |
| 5,253,086 | 10/1993 | Lungershausen et al. | 359/15 |
| 5,652,681 | 7/1997 | Chen et al. | 359/566 |

FOREIGN PATENT DOCUMENTS

| | | | |
|---|---|---|---|
| 3-261907 | 11/1991 | Japan | 359/837 |
| 4-98214 | 3/1992 | Japan | 359/837 |

OTHER PUBLICATIONS

K. Brenner and A. Huang, "Optical Implementations Of The Perfect Shuffle Interconnection," Applied Optics 27, 135 (1988).
J. Jahns and M. Murdocca, "Crossover Networks And Their Optical Implementation," Applied Optics 27, 3155 (1988).
J. Jahns, "Optical Implementation Of The Banyan Network," Optics Communications 7b, 321 (1990).
S. Bian, K. Xu, and J. Hong, "Optical Perfect Shuffle Using Wollaston Prisms," Applied Optics 30, 173 (1991).
B. Robertson, E. Restall, M. Taghizadeh, and A. Walker, "Space–variant Holographic Optical Elements In Dichromated Gelatin," Applied Optics 30, 2368 (1991).
10th Interdisciplinary Laser Science Conference, Abstract, TuH3, "Image –plane perfect shuffle interconnects," on or before Oct. 2, 1994.

Primary Examiner—Jon Henry
Attorney, Agent, or Firm—Jerry Cohen

[57] ABSTRACT

The present invention provides an optical rearranging device that is simple, compact, highly efficient, and is located in the proximity of an image plane. This device utilizes diffractive, refractive, and/or reflective elements and can produce a perfect shuffle or other interconnect pattern that is useful in computing, communication, and switching applications involving optically carried information. Further, this device can be made from redirecting elements that are themselves switchable, thus enabling a direct switching between the non-rearranged interconnect pattern and other rearranged interconnect patterns.

23 Claims, 6 Drawing Sheets

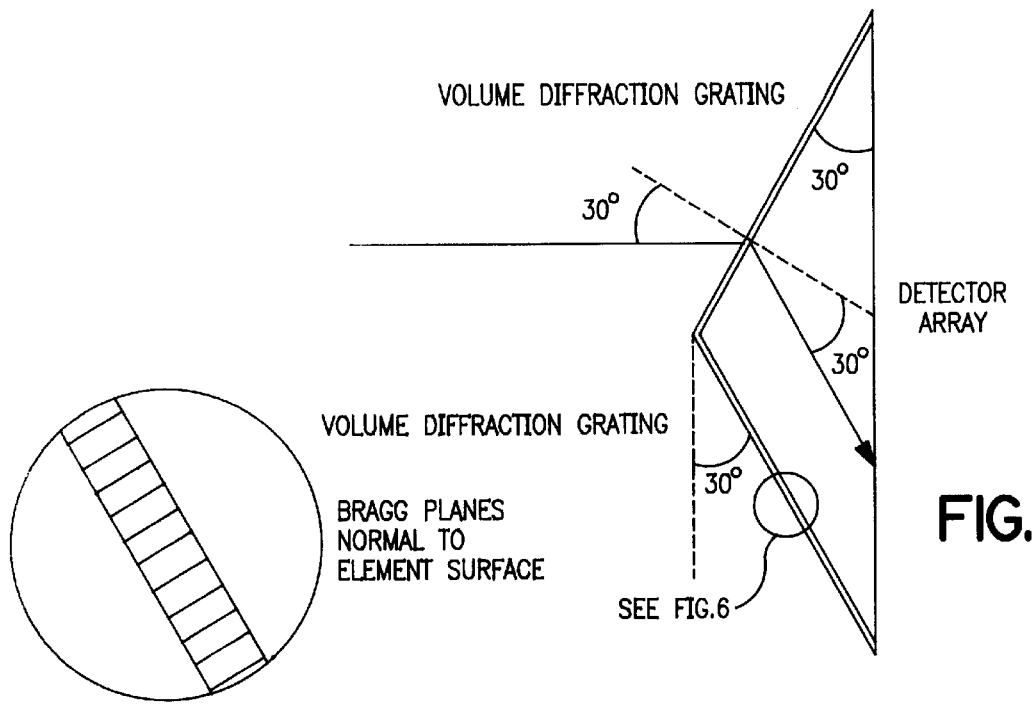
FIG. 5
FIG. 6
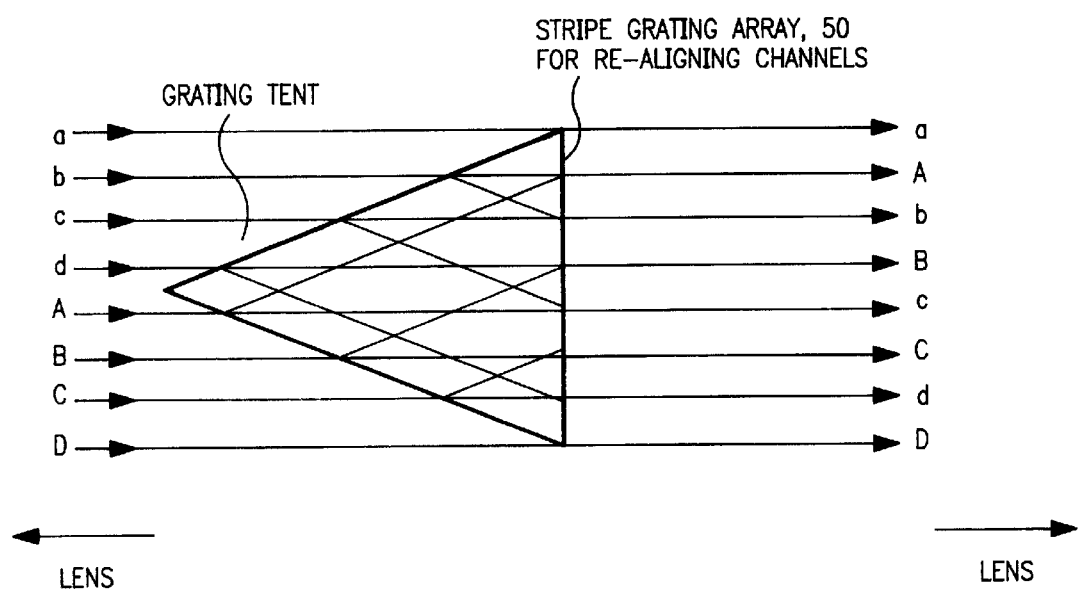
FIG. 7

Image Plane Perfect Shuffle

Input

1/2 Field Covered

Gratings Raised

OPTICAL SHUFFLE DEVICE

STATEMENT OF GOVERNMENT INTEREST

This invention was made under Air Force Contract No. F 30602-91-C-01-01 and the U.S. Government has a paid-up license in this invention.

RELATED APPLICATION

This application claims priority of provisional application Ser. No. 60/004,716 filed Oct. 3, 1995.

FIELD OF THE INVENTION

This invention relates generally to shuffle devices used as interconnectors, and, more particularly, to an optical perfect shuffle device which has use in a wide variety of switching applications.

BACKGROUND OF THE INVENTION

The "perfect" shuffle is a pervasive interconnect that is used throughout switching applications. Frequently, the "perfect" shuffle is used in high level descriptions of systems, whereas a different interconnect is used in implementations because of the difficulty of implementing a perfect shuffle well using electronics. While "perfect" shuffle devices are useful architecturally, they provide a space-variant interconnect pattern that is difficult to implement optically in an efficient, compact manner. Typical approaches for optically implementing perfect shuffles include splitting, magnifying, and interleaving the resultant images using interferometers or the use birefringent crystals. In a typical micro-optic approach, individual channels are reshuffled using holographic microlenses. In the latter approach, many redirecting elements are needed (e.g., one per channel), where in the current approach few (e.g. two) redirecting elements are required.

It is an object of this invention to provide a unique approach to providing an optical perfect shuffle device.

It is another object of this invention to provide refractive, diffractive or reflective optical elements within an optical perfect shuffle device.

It is another object of this invention to provide an optical perfect shuffle device that has high efficiency and low loss.

It is another object of this invention to provide an optical perfect shuffle device that is simple and compact, and only requires that the device be placed near an image plane.

SUMMARY OF THE INVENTION

The present invention overcomes problems associated with past shuffles by providing unique deviation means located proximate an image plane for rearranging spatial image components within the image plane.

In a typical mode of operation, the optical perfect shuffle device of the present invention operates as follows. An input array of beams, as may originate from a collection of optical channels carrying digital or analog information, is imaged onto an output plane where detectors or other devices are arrayed, or in the alternative, are cascaded. This output plane is also described in the present invention as the output array, image plane or detector plane. Since the perfect shuffle device is proximate the image plane, the rays from different spatial regions of the input are localized near corresponding locations in the image. The optical perfect shuffle device of this invention is placed directly in front of the image plane, intercepts localized rays of light, and redistributes them spatially in the image plane. For the case of the perfect shuffle, ray bundles at the edge of the input plane (intersecting the device at the image plane) are not translated. The closer the ray bundles are to the vertex of the device, the more they are translated, resulting in the perfect shuffle pattern of spatial distribution in the output plane. While the perfect shuffle interconnection pattern has been demonstrated with specific embodiments of this invention, other variations are possible within the scope of this invention.

For a better understanding of the present invention, together with other and further objects, reference is made to the following description taken in conjunction with the accompanying drawings, and its scope will be pointed out in the appended claims.

BRIEF DESCRIPTION OF THE DRAWINGS

FIG. 5 is a geometrical representation of $\alpha$ for normal Bragg planes wherein volume diffraction gratings are used in the optical perfect shuffle device of this invention;

FIG. 6 is an exploded view illustrating Bragg planes normal to the grating surface as shown in FIG. 5;

FIG. 7 is a schematic representation of a cascadable diffractive optical perfect shuffle device of this invention;

DETAILED DESCRIPTION OF THE PREFERRED EMBODIMENTS

Figure 1:
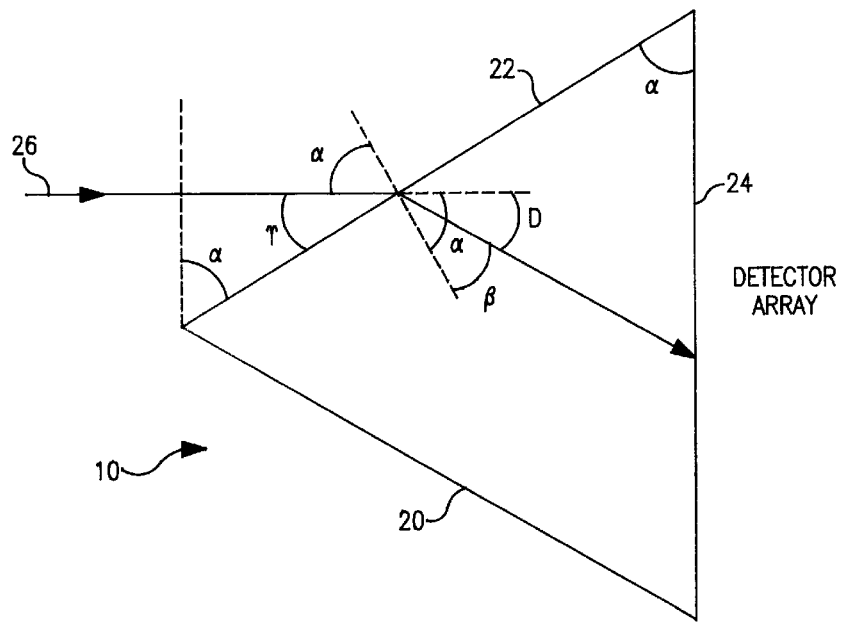
FIG. 1 is a geometrical representation of the concept providing the basis of the optical perfect shuffle device of this invention.

The optical shuffle device of this invention operates on a 1- or 2-dimensional array of optical beams or spots of light and permutes the order of them in a well defined manner. In the embodiments shown, this re-ordering of the spot locations provides an optical means for implementing the interconnect topology known as the "perfect shuffle." For the case of a 2-dimensional input of beams or spots, the shuffle device of this invention can perform a perfect shuffle in either 1- or 2-dimensions. The interconnection topology for the 1-dimensional perfect shuffle is shown in the drawings. Two dimensional perfect shuffles can be implemented in directly analogous configurations of image plane devices. Although this invention embodies perfect and other types of shuffles, for convenience, the terms "shuffle" and "perfect shuffle" may be used interchangeably throughout the following description.

The basic concept of the optical perfect shuffle device 10 is shown geometrically in FIG. 1. Two diffracting or refracting surfaces 20 and 22 are positioned symmetrically over or proximate the image plane 24. Any conventional detector array may be located at the image plane 24. The angle of inclination of these surfaces, $\alpha$, is an important parameter in the optimization of the device 10, but is to first order independent of its function. As shown in FIG. 1, the central requirement is that the incident light 26 be deviated by an angle D such that it propagates parallel to the opposite side of the device. Using the notation shown in the figure, D must be given by:

$$D = \pi/2 - \alpha \quad (1)$$

where the angles are expressed in radians. This equation is a first-order constraint on the configuration. When this condition is met and an array of beams is imaged onto the image plane 24, the spots from one half of the field can be spread over the entire plane and interlaced with spots from the other half field. This operation forms a perfect shuffle of the imaged optical channels.

Figure 2:
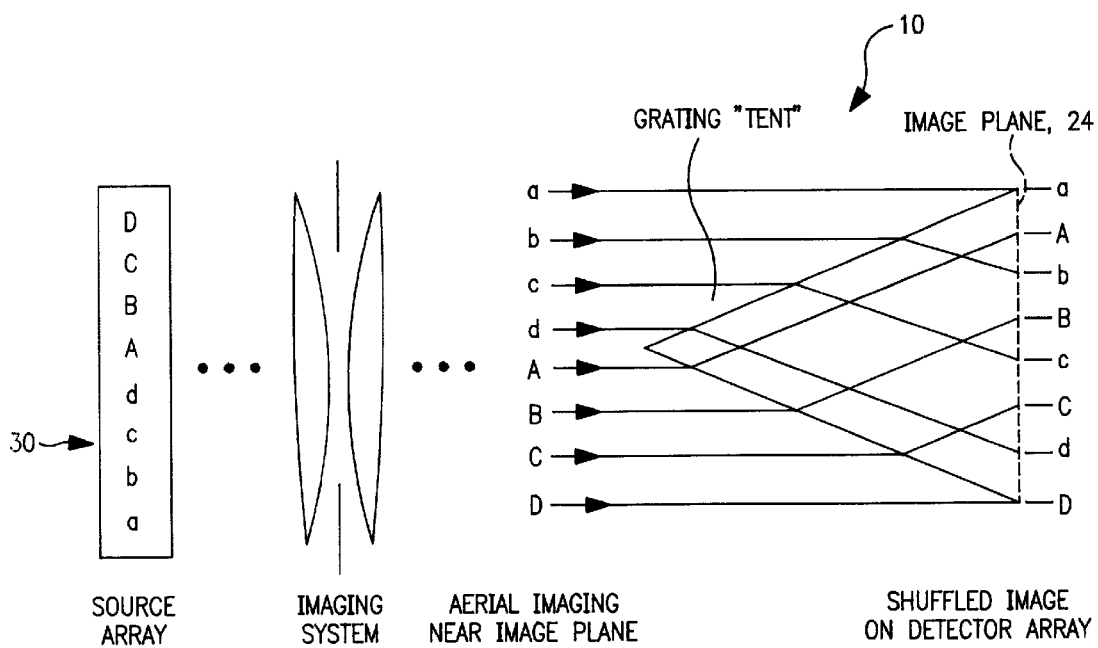
FIG. 2 is a system representation of the components utilized with the optical perfect shuffle device of this invention.

The formation of the perfect shuffle by imaging through device 10 is illustrated in FIG. 2. Here an object array of sources 30 are labeled a–d across the first half of the field and A–D across the second. This source array 30 is imaged on to the optical perfect shuffle device 10, in the form of, for example a grating tent or refractive prism, and the sources in each half field are deviated by equal and opposite angles. However, the edge channels a and D are in contact with the detector plane, and so no net translation is imposed. It is a different case with the other channels, where the closer to the apex they become, the farther from the detector plane they are, and thus experience progressively larger and larger lateral translations. This interlacing effect rearranges the locations of the spots such that the sequence is now aAbBcCdD—the perfect shuffle operation on the input sequence abcdABCD.

The angular deviation required in the image plane perfect shuffle device 10 may be introduced by refraction from one media into another. The simplest case of this configuration is when a prism is in contact with the image plane 24. If the face of the prism is tilted by "tent angle" with respect to the detector array.

The image plane perfect shuffle device relies on refractive or diffractive surfaces that are inclined at an angle in the vicinity of the image plane. Typically these surfaces are symmetric and take on the appearance of a "tent" or wedge with a base resting on the image plane. The inclination of these "tent" surfaces may range between extremes of either shallow (hugging the image plane) or peaked (sharply rising away from the image plane). Many tradeoffs are affected by this degree of inclination, as described below. Consequently, the angle $\alpha$ may also be referred to as the tent angle.

It is seen from FIG. 2 that the angle of incidence of an axial ray is also $\alpha$ (since both angles form 90° with $\alpha$). With the prism of refractive index $n_2$ surrounded by a medium of refractive index $n_1$, Snell's law provides the second constraint on the configuration:

$$n_1 \sin \alpha = n_2 \sin \beta \quad (2)$$

where $\beta$ is the angle of refraction at the interface. From FIG. 2 it is also clear that the deviation angle D may be expressed in terms of the incident and refracted angles as:

$$D = \alpha - \beta \quad (3)$$

Setting Eqs. 1 and 3 equal and using Eq. 2 to express in terms of $\alpha$ and the refractive indices, the face angle of the prism may be expressed as a variable governed only by the parameters of n1 and n2

$$2\alpha - \pi/2 - \sin^{-1}[n_1/n_2 \sin \alpha] = 0 \quad (4)$$

Figure 3:
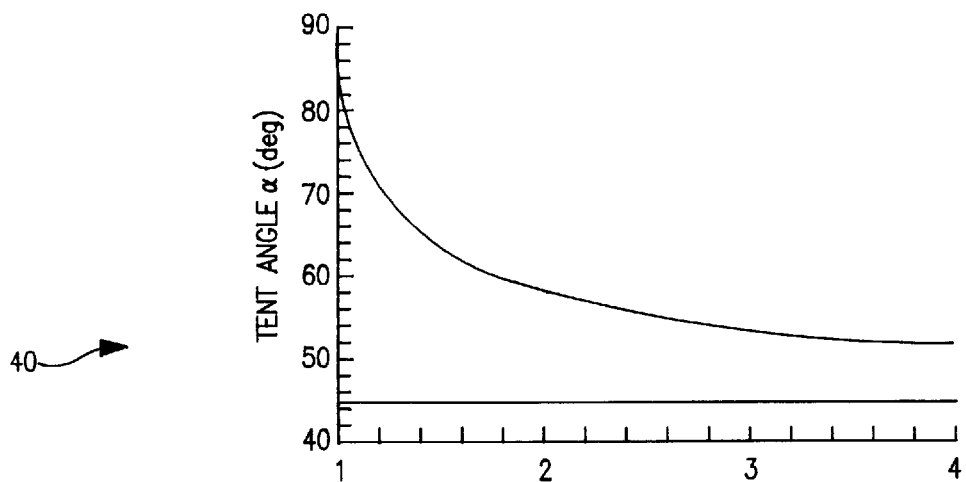
FIG. 3 is a graphic representation of the relationship between the angle $\alpha$ and the refractive index for the optical perfect shuffle device of this invention.

In the following discussion it is assumed that the prism is in air, and so the tent angle $\alpha$ of the prism is determined completely by choice of prism refractive index. This relationship is plotted in graph 40 shown in FIG. 3. Considering first the limiting cases, it is seen that a refractive index of unity corresponds to a tent angle of 90°. This is the trivial case where the prism does not physically exist, the two prism faces are parallel, and at a tent angle of 90° the "refracted" angle is trivially parallel to the other prism face. At the other extreme, an infinitely high refractive index causes the refracted ray to emerge on the surface normal, and thus a tent angle of 45° is the solution for the refracted ray to be parallel to the opposite prism face. In the graph 40 of FIG. 3, it is seen that the curve is equal to 90° at unity index and is asymptotic to 45° (shown by the horizontal line) as the prism refractive index grows unbounded.

It is particularly interesting that the tent angle $\alpha$ hits 60° in the refractive index range of common refractive materials. Specifically, when the refractive index is $n_2=1.732$, the tent angle is 60°. Depending on wavelength used, many optical glasses (e.g., Schott SF10, SF53, LaK N16, LaF N8, BaSF 54) exhibit this refractive index. Glasses with this refractive index will provide an added benefit of a lower fabrication cost, since many test surfaces are available with angles that are multiples of 30°. Surface reflections can be eliminated by choosing a refractive index such that Brewster's angle is obtained at the refractive interface.

It was found above that the refractive approach in providing the optical perfect shuffle device 10 of this invention is tightly constrained, in that the refractive index of the material used in the prism dictates a single solution for the angle of the prism, and therefore fixes the physical geometry. As an alternate embodiment, when diffractive elements are used in a grating tent, the tent angle $\alpha$ is now unconstrained and a solution can be obtained for a broad range of angles. This follows since, as shown in FIG. 2, the spatial period of the grating can be chosen to match the incident angle to the desired diffracted angle (Eq. 1) independently of the angle of the grating surface. With a broad range of geometries now possible, higher order considerations may be optimized in the choice of $\alpha$.

Very small values of $\alpha$ result in flat geometries where the diffracted angle is very large. This condition enhances wavelength sensitivities (increases dispersion) and tightly constrains the bandwidth of the light used. Further, there is a large variation in optical path between the edge rays and vertex rays. The edge rays travel directly to the image plane 24, while in the limiting case, the vertex rays can travel paths that are up to half the field width longer. This can put an unrealistic demand on the depth of focus required in the imaging stage to maintain acceptable spot diameters.

Figure 4:
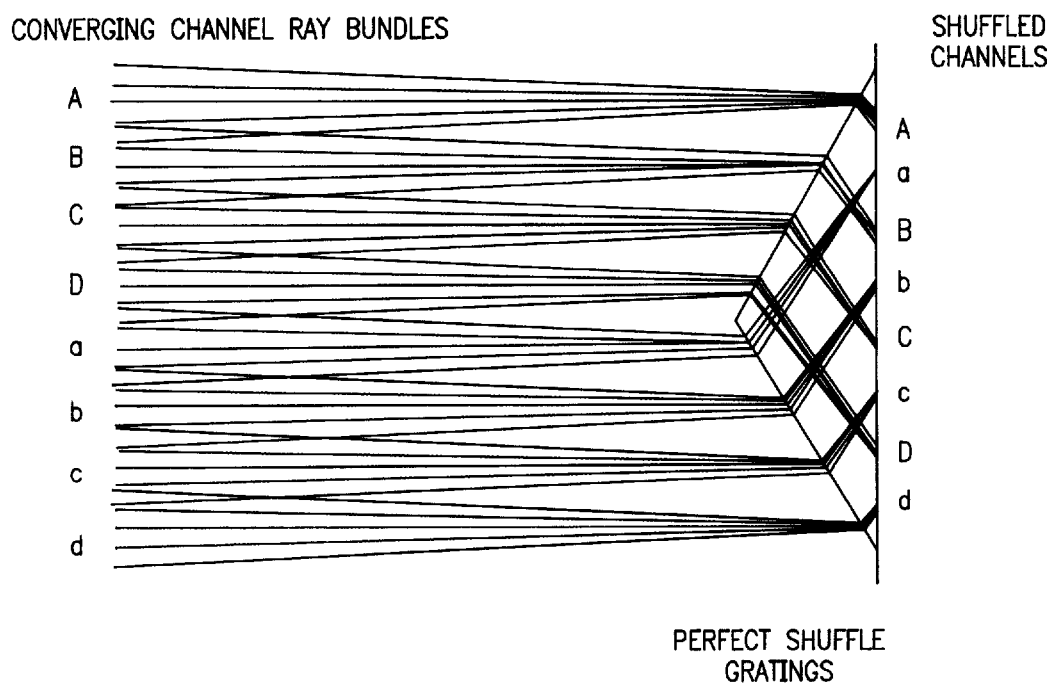
FIG. 4 is a ray trace diagram for an uncorrected image plane.

At the other end of the tradeoff, very large values of $\alpha$ create a highly peaked geometry in which the vertex of the grating tent protrudes a significant distance toward the imaging lenses. This is undesirable for many reasons, chief of which is that the image plane locality is lost and the ray bundles for each optical channel become wide in the vertex region. When this occurs optical channels near the center of the field partly overlap the wrong grating, and spurious signals are generated. This type of difficulty is evident in the ray trace diagram as illustrated in FIG. 4.

It is clear that the intermediate values of α are desirable for the image plane optical perfect shuffle device 10 geometry. When volume diffraction gratings are used in the device, however, there is a practical factor that can be dominant in choosing the value of α. Volume diffraction gratings rely on alignment of the Bragg planes in the grating for high efficiency. When the gratings are fabricated at the same wavelength and angles at which they will be used, these Bragg planes are inherently aligned during exposure for peak efficiency. However, most recording materials including dichromated gelatin and photopolymers typically shrink or expand during processing, resulting in a net rotation of these Bragg planes. This angular detuning is a function of the departure of the Bragg planes from the normal to the substrate. For Bragg planes at 45° to the substrate, the detuning is most sensitive to shrinkage and expansion of the recording material. When perpendicular or parallel to the substrate normal, however, there is no angular detuning of the Bragg planes with swelling or shrinking. Since the diffraction efficiency decreases very rapidly with this Bragg plane detuning, choosing a geometry such that the Bragg planes are normal to the substrate can be very useful. The Bragg planes are normal to the substrate when the angle of diffraction is equal to the angle of incidence. The simultaneous solution for this constraint and that of Eq. 1 is readily shown to occur when α=30°, as illustrated in FIG. 5.

In the image plane perfect shuffle device configurations described above it is assumed that the devices 10 are in contact with a plane containing an array of detectors or devices. As long as the devices in the array are not very sensitive to the incident angle of optical flux, it is of little consequence that alternating optical channels arrive from alternate (but equal) angles. For some devices, however, this might not be the case. Further it can be very useful to perform a perfect shuffle on an array of optical channels and then to cascade them with other systems without direct detection. These latter two cases can be accommodated by placing an array of stripe gratings 50 in the image plane in order to realign the shuffled optical channels.

The use of a grating array 50 with striped pixelation for redirecting the shuffled channels back on axis is illustrated in FIG. 7. The grating array is located in or near the image plane 26 and diffracts alternating channels in opposite directions. The shuffled array of optical channels then continues to defocus and propagate toward the next imaging lens. Successive stages can then be cascaded. Defocus variations and other aberrations must be corrected to a higher degree when multiple stages are cascaded without beam regeneration.

Figure 8:
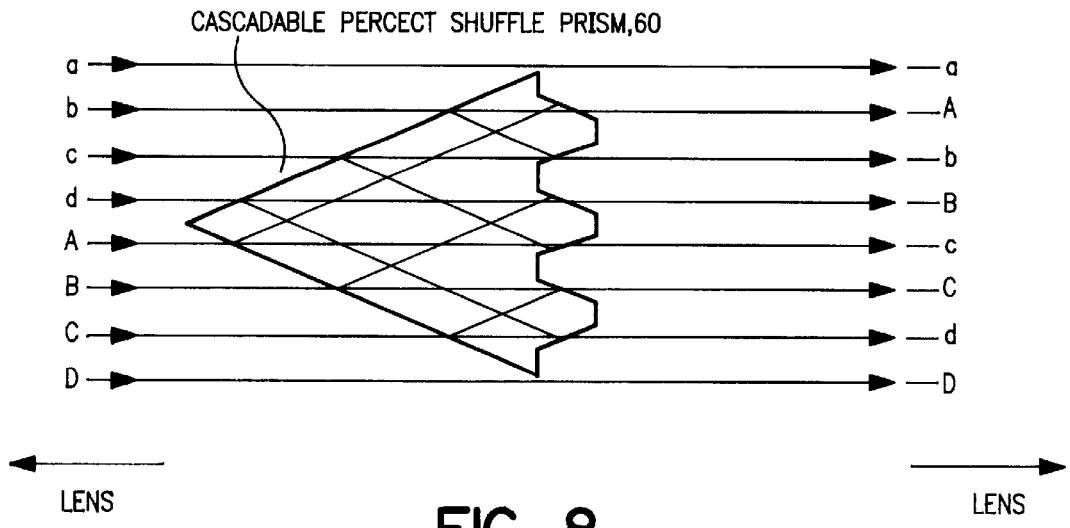
FIG. 8 is a schematic illustration of a cascadable refractive optical perfect shuffle device of this invention with the facets in the exiting face of the prism parallel to alternate sides of the prism.

Although a single grating can be placed in the image plane to accomplish the redirection, using pixelated gratings 50 allows the use of highly efficient elements that can exhibit diffraction efficiencies of nearly 100%. In the refractive approach, the rear surface of the prism 60 can be faceted in order to realign the channels. This is illustrated in FIG. 8.

The primary advantages of the refractive and diffractive image plane perfect shuffle devices of this invention are their nearly ideal efficiency, compactness, and simplicity. As with any new approach, the advantages of this invention are accompanied by tradeoffs and potential limitations. For example, imaging through the tilted gratings or prism faces gives rise to aberrations that must be controlled or balanced. One approach is to limit the numerical aperture of the rays so the aberrations are acceptable and the depth of focus accommodates the variation of path lengths across the aperture of the device. Alternatively, it is advantageous in some cases to introduce compensating elements in the imaging lens or near the image plane. For example, field curvature can be introduced to compensate for the variation in path lengths introduced by the device.

Another consideration is the magnification introduced by imaging through the tilted elements. This anamorphic magnification is similar to that introduced by Brewster telescopes. While it is possible to compensate this magnification for extended images, the application of this device for optical interconnection typically involves the shuffling of many optical channels that are focused to spots. In this application the magnification may not be a detriment since the focused channels will not overlap. Correction may be required, however, where spot sizes must be maintained at a minimum, for example for devices with minimized apertures for speed considerations. Finally, as the numerical aperture of the imaging system increases, pixels near the vertex of the field will be subject to spurious splitting as discussed earlier.

Figure 9:
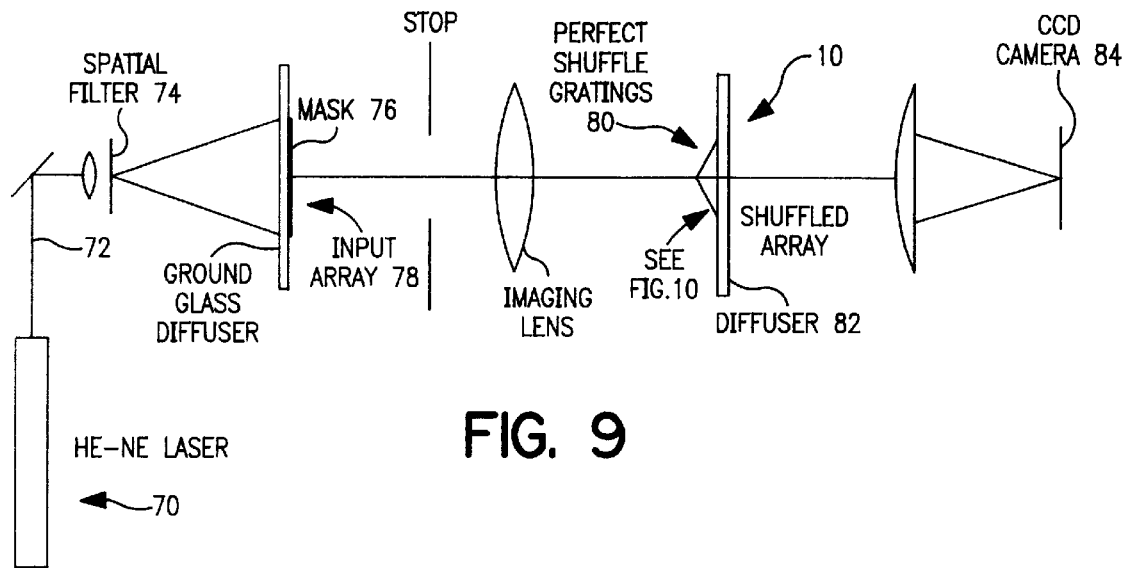
FIG. 9 is a schematic representation of a system utilizing the optical perfect shuffle device of this invention.
Figure 10:
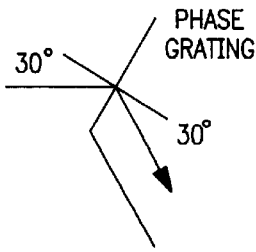
FIG. 10 is geometrical representation of the optical perfect shuffle gratings of FIG. 9.

The operation of the optical image plane perfect shuffle device 10 of this invention is demonstrated using the experimental set up shown in FIG. 9. It should be realized, however, that the present invention is not limited to this set up. Referring to FIG. 9, a laser source such as helium-neon laser 70 produces a beam 72 which is expanded using a spatial filter 74 and illuminates a mask 76 (through a ground glass diffuser) which represents an input array 78. This mask 76 is imaged onto the diffractive perfect shuffle gratings 80 of device 10, which are in contact with a thick opal glass diffuser 82. The mask array is shuffled onto the diffuser by the gratings, and photographed through the diffuser using a CCD camera 84. The gratings can be raised and lowered to compare the shuffled and direct images. The gratings 80 were recorded by interfering symmetric plane waves each of which are incident at an angle of 30° from the surface normal. The Bragg planes were thus normal to the grating surface, and the 30° tent angle described earlier for volume diffraction gratings was used for the grating tent as shown in the FIG. 10. The gratings 80 that were used in this preliminary demonstration were recorded in a silver bromide photographic plate and bleached with Bromine after development. The gratings 80 that were used were only approximately 60% efficient (into the first order) and in practice dichromated gelatin, photopolymers, other volume recording materials, surface relief diffractive elements, or other gratings, most of which are capable of nearly 100% diffraction efficiency, would preferably be used. Such high-efficiency gratings would reduce the zero order to negligible levels. Alternatively, gratings that are approximately 50% efficient may be used so that both unshuffled (straight through) and shuffled (rearranged) images can be simultaneously obtained. If desired, a slight offset can be introduced between these two images so that they may be separated.

Figure 11A:
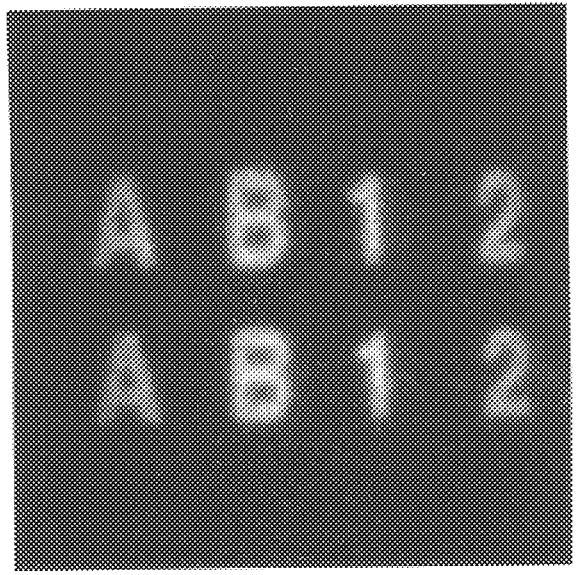
FIGS. 11A–11C are photographic representations wherein the mask array is shuffled into the diffuser by gratings and photographed through the diffuser using a CCD camera.
Figure 11B:
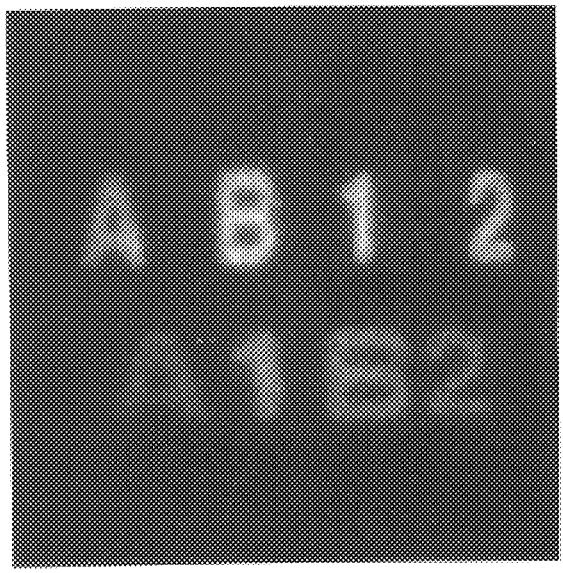
Figure 11C:
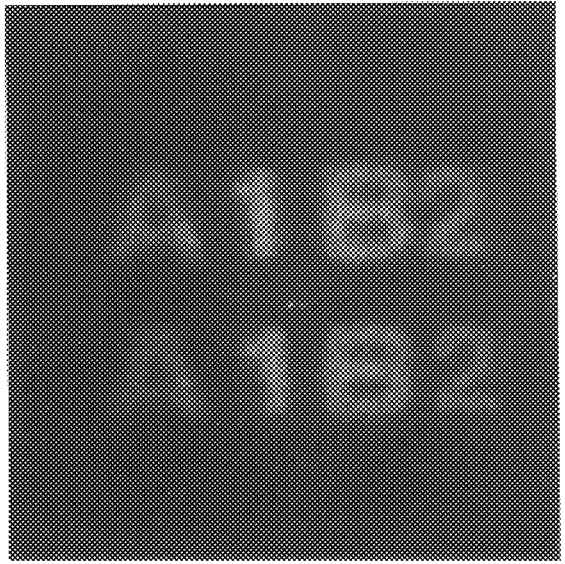

The results observed using the configuration of FIG. 9 are shown in the three CCD photographs in FIGS. 11A, 11B and 11C. FIG. 11A is an image of the mask 76 with the perfect shuffle gratings of this invention removed. The mask pattern contains the characters AB 12 duplicated in 2 rows. The sharpness of the image of the mask is reduced by two effects. First, there is speckle across the field because of the narrow band laser light propagating through the ground glass and opal glass diffusers. The sharpness is further reduced because the image is viewed through the opal glass diffuser. This lack of sharpness is an anomaly of this feasibility demonstration. When used to interconnect an array of optical channels, no diffusers would usually be used in the optical system and both sources of degradation would be eliminated.

As the perfect shuffle gratings are raised across the image plane, the mask pattern is shuffled. When the field is half covered, the bottom row becomes A1B2, which is the perfect shuffle of the input pattern. Several effects are evident in FIGS. 11B and 11C. First, the brightness of the shuffled image is reduced due to the relatively low diffraction efficiency of the gratings (approximately 60%). The anamorphic magnification described above is also evident, as well as a small lateral image compression due to refraction in the glass grating substrate and a slight mismatch in grating tent width and input image width. Careful observation also reveals the faint unshuffled input characters that are superimposed on the shuffled characters. The latter effect is a result of the energy in the zero order leaking through. As the grating diffraction efficiency is increased, the latter effect will be reduced.

The image plane perfect shuffle configurations described here are highly efficient, compact, and simple. They can be implemented with either conventional diffractive, reflective or refractive elements, and can either be used in contact with an image plane or detector plane, or can be cascaded. Refractive versions can be fabricated with simple-to-manufacture angles, or at Brewster's angle to eliminate interface reflection losses. Diffractive elements give wider flexibility for the tent angles, and if volume diffractive elements are used, a tent angle of 30 degrees eliminates the efficiency losses resulting from recording material thickness changes during processing. Tradeoffs include the need to limit numerical apertures in the imaging stage (at least near the vertex) and the need to compensate for optical path variations across the field and other aberrations.

In a more general sense a typical mode of operation is as follows. An input array of beam, as may originate from a collection of optical channels carrying digital or analog information, is imaged onto an output plane where detectors or other devices are arrayed, or in the alternative, are cascaded. For example, multiple perfect shuffle devices may be cascaded to rearrange the channels in more than one dimension. This output plane is also described in the present invention as the output array, image plane or detector plane. Since the perfect shuffle device is proximate the image plane, the rays from different spatial regions of the input are localized near corresponding locations in the image. The optical perfect shuffle device of this invention is placed directly in front of the image plane, intercepts localized rays of light, and redistributes them spatially in the image plane. For the case of the perfect shuffle, ray bundles at the edge of the input plane (intersecting the device at the image plane) are not translated. The closer the ray bundles are to the vertex of the device, the more they are translated, resulting in the perfect shuffle pattern of spatial distribution in the output plane. While the perfect shuffle interconnection pattern has been demonstrated with specific embodiments of this invention, other variations are possible within the scope of this invention.

There are many possible advantages of using optics for the interconnection of devices. It is likely that one of the uses of optical technology that can favorably impact optical interconnection is to provide reconfigurability. Here too there are many approaches including spatial light modulators, addressable mirror arrays, acousto-optic Bragg cells, etc. Among these approaches and of particular interest here is the use of electrically or optically switchable diffractive elements for optical interconnection.

Figure 12:
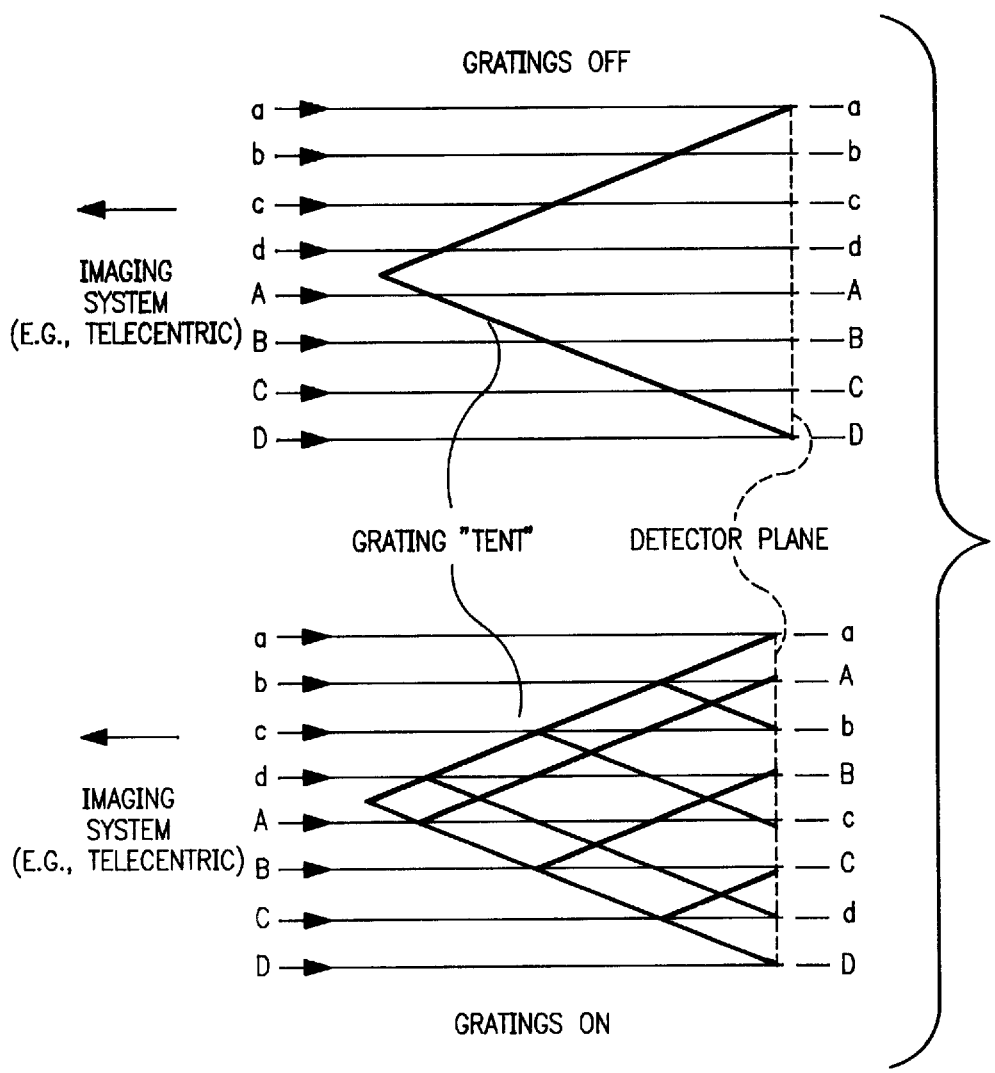
FIG. 12 is a schematic representation of a switchable optical perfect shuffle device of this invention.

Switchable nonlinear gratings can be used to replace the diffractive elements of the optical image plane perfect shuffle device 10 and the cascaded volume gratings within the scope of this invention. The switchable image plane perfect shuffle is illustrated in FIG. 12. Here an array of eight optical channels are shown. With the gratings "off" each of the channels is passed directly through to its corresponding device, detector, or mating channel. By switching the gratings used in the image plane perfect shuffle "on," these eight channels are now rearranged in a perfect shuffle. The flexibility to alter the basic topology of the interconnect for different time steps can be very powerful. Since the interconnects operate at large bandwidths once they are established, even switching frequencies on the order of 1 kHz may be useful.

Although the invention has been described with reference to particular embodiments, it will be understood that this invention is also capable of further and other embodiments within the spirit and scope of the appended claims.

What is claimed is:

1. An image rearranging device comprising:
    deviation means located proximate an output image plane for rearranging spatial image components of an object in an input image plane into a rearranged image within said output image plane;
    and said deviation means includes a first planar surface and a second planar surface, said planar surfaces intersecting each other at one end thereof and defining an angle $\alpha$ with respect to said output image plane at the other ends thereof thereby scanning said output image plane, and said spatial image components being deviated by an angle D, wherein $D=\pi/2-\alpha$.

2. The image rearranging device as defined in claim 1 wherein said at least one surface comprises a diffractive element.

3. The image rearranging device as defined in claim 1 wherein said at least one surface comprises a refractive element.

4. The image rearranging device as defined in claim 1 wherein said at least one surface comprises a reflective element.

5. The image rearranging device as defined in claim 1 wherein said at least one surface comprises a combination of diffractive and refractive elements.

6. The image rearranging device as defined in claim 1 wherein said deviation means has at least one portion thereof terminating substantially at said output image plane.

7. The image rearranging device as defined in claim 1 wherein substantially all electromagnetic radiation of said spatial image components of said object incident at said input image plane is redirected as said rearranged image at said output image plane in the form of a perfect shuffle of said object.

8. The image rearranging device as defined in claim 1 wherein a perfect shuffle of said spatial image components of said object in said input image plane are effected at said output image plane.

9. The image rearranging device as defined in claim 1 wherein said at least one surface is in the form of a switchable optical means for controlling the deviation of said spatial image components incident on said surface.

10. An optical perfect shuffle device for use in conjunction with an imaging device forming conjugate object/image planes defining a plurality of optical channels, said optical perfect shuffle device comprising:
    deviation means, including at least one surface located in proximity to one of said object/image planes, for redirecting said optical channels from one of said conjugate object/image planes to another in the pattern of a perfect shuffle without splitting each of said optical channels into more than one optical path; and said at least one surface being substantially less in number than said plurality of optical channels.

11. The optical perfect shuffle device as defined in claim 10 wherein said at least one surface comprises a diffractive element.

12. The optical perfect shuffle device as defined in claim 10 wherein said at least one surface comprises a refractive element.

13. The optical perfect shuffle device as defined in claim 10 wherein said at least one surface comprises a reflective element.

14. The optical perfect shuffle device as defined in claim 11 wherein said at least one surface comprises a combination of diffractive and refractive elements.

15. The optical perfect shuffle device as defined in claim 10 wherein said at least one surface is in the form of a switchable optical means for controlling the deviation of said spatial image components incident on said surface.

16. An optical perfect shuffle device comprising:

deviation means, including at least one surface located in proximity to an optical input, for rearranging at least four optical channels from said optical input to an optical output in the pattern of a perfect shuffle without splitting each of said optical channels into more than one optical path; and said at least one surface being substantially less in number than said plurality of optical channels.

17. The optical perfect shuffle device as defined in claim 16 wherein said at least one surface comprises a diffractive element.

18. The optical perfect shuffle device as defined in claim 16 wherein said at least one surface comprises a refractive element.

19. The optical perfect shuffle device as defined in claim 16 wherein said at least one surface comprises a reflective element.

20. The optical perfect shuffle device as defined in claim 16 wherein said at least one surface comprises a combination of diffractive and refractive elements.

21. The optical perfect shuffle device as defined in claim 16 wherein said at least one surface is in the form of a switchable optical means for controlling the deviation of said spatial image components incident on said surface.

22. An optical perfect shuffle device for use in conjunction with an imaging device forming conjugate object/image planes defining a plurality of optical channels, said optical perfect shuffle device comprising:

deviation means, including at least one surface located in proximity to one of said object/image planes, for redirecting said optical channels from one of said conjugate object/image planes to another in the pattern of a perfect shuffle without splitting each of said optical channels into more than one optical path; and said at least one surface deviating all said optical channels by substantially the same magnitude of deviation, D.

23. An optical perfect shuffle device comprising:

deviation means, including at least one surface located in proximity to an optical input, for rearranging at least four optical channels from said optical input to an optical output in the pattern of a perfect shuffle without splitting each of said optical channels into more than one optical path; and said at least one surface deviating all said optical channels by substantially the same magnitude of deviation, D.

* * * * *